United States Patent Office 2,839,536

Patented June 17, 1958

2,839,536

SALTS OF DISUBSTITUTED CARBAMIC ACID ESTERS AND PROCESS FOR THE MANUFACTURE THEREOF

Otto Schnider and Rene Urban, Basel, Switzerland, assignors to Hoffmann-La Roche Inc., Nutley, N. J., a corporation of New Jersey

No Drawing. Application August 21, 1956 Serial No. 605,417

Claims priority, application Switzerland September 16, 1955

6 Claims. (Cl. 260—295)

This invention relates to salts of di-substituted carbamic acid esters and to a method for producing those salts. The novel compounds of this invention may be represented by the following general formula:

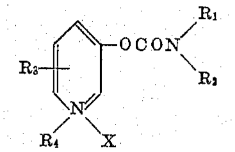

wherein $R_1$ and $R_2$ each represents a substituted or unsubstituted alkyl, aralkyl, or aryl radical and wherein at least $R_1$ includes a benzene nucleus, $R_3$ represents hydrogen, halogen, or a lower alkyl, or lower alkoxy group, $R_4$ represents an alkyl or an alkenyl (i. e. monounsaturated, aliphatic) radical each having 8 to 18 carbon atoms, and X represents a pharmaceutically acceptable anion of an acid.

$R_1$ and $R_2$ in the above formula may represent lower alkyl groups such as methyl, ethyl, isopropyl and butyl, mono- and bi-cyclic aryl groups such as phenyl, nitrophenyl, tolyl, naphthyl, chloronaphthyl, halophenyl such as chlorophenyl, alkoxyphenyl such as methoxyphenyl and ethoxyphenyl and unsubstituted and substituted aralkyl groups such as benzyl, chlorobenzyl and nitrobenzyl. $R_3$ may represent halogens such as chloro, bromo and fluoro, lower alkyl groups such as methyl, ethyl and isopropyl, and lower alkoxy groups such as methoxy, ethoxy and isopropoxy. $R_4$ may represent 8 to 18 carbon atom alkyl or alkenyl groups such as n-octyl, decyl, undecyl, undecenyl, dodecyl, hexadecyl or octadecyl. X may represent acid anions such as the halides chloro, bromo and fluoro, sulfate, or monoaryl sulfonates such as p-toluene sulfonate.

A preferred class within the scope of this invention constitutes those compounds wherein $R_1$ and $R_2$ represent an aryl or substituted aryl, $R_3$ represents hydrogen or lower alkyl, $R_4$ represents an alkyl containing 10–12 carbon atoms and X represents a halogen atom in the above formula.

A most preferred class within the scope of this invention constitutes those compounds wherein $R_1$ and $R_2$ represent phenyl or p-chlorophenyl groups, $R_3$ represents hydrogen, $R_4$ represents an alkyl containing 10–12 carbon atoms and X represents a bromine atom in the above formula.

Compounds of this invention are produced by reacting an N,N-di-substituted carbamic acid ester having the general formula:

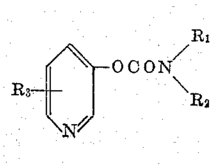

wherein $R_1$, $R_2$ and $R_3$ have the significance defined above, with a quaternizing agent, $R_4X$ wherein $R_4$ and X have the same significance defined above.

The N,N-di-substituted carbamic acid esters may be produced, for example, by esterification of 3-hydroxypyridine, or a nuclearly substituted derivative thereof, with an N,N-di-substituted carbamic acid halide or by the action of phosgene on 3-hydroxypyridine and the condensation of the chloroformic acid ester thus formed with a secondary amine.

The quaternization reaction may be carried out at elevated temperature, preferably between 80° and 160° C., in an alcohol, for example, ethanol or n-butanol. The solvent may be omitted if desired. As quaternizing agent of the formula $R_4X$ advantageously an ester of a hydrohalic acid, preferably of the hydrobromic acid, is used. The quaternary salt produced may be converted, if desired, into other salts by conventional methods. For example, the quaternary salt may be converted with a base into the quaternary base and the latter may be neutralized with an acid containing the desired anion. According to another modification, an aqueous solution of the quaternary salt may be passed through an anion exchange resin, whereby the anion of the quaternary salt is exchanged for another.

Some of the novel quaternary salts of N,N-di-substituted carbamic acid esters are crystalline and others are oily. They range from slightly to very slightly soluble in water and insoluble in benzene or ether, but are readily soluble in lower aliphatic alcohols, in acetone and in chloroform.

The compounds of this invention are useful as bactercides, e. g. in combatting organisms such as *Staphyloccus aureus haemolyticus, β-Streptococcus haemolyticus, enterococcus, Bacillus anthracis* and *Escherichia coli*. These compounds can be used in germicidal preparations in high dilution. Compounds of this invention are also useful in caries prophylaxis, e. g. in combatting organisms associated with the production of dental caries such as oral filamentous fungi and oral yeast.

*Example 1*

50 parts by weight of diphenylamine were heated to 150° C. and saturated with phosgene. After cooling, the solid mass which formed was recrystallized from 100 parts by volume of absolute alcohol. There were obtained 46 parts by weight of diphenyl-carbamic acid chloride, M. P. 85–86° C. This acid chloride was refluxed for 6 hours with 20 parts by weight of 3-hydroxy-pyridine in 100 parts by volume of pyridine. The reaction mixture was evaporated to dryness in vacuo, the residue was taken up in water and benzene, the benzene extract was washed with dilute sodium hydroxide solution and water, dried over water-free sodium sulfate and evaporated to dryness. The solid residue was recrystallized from 150 parts by volume of butyl ether. The N,N-diphenyl-carbamic acid ester of 3-hydroxypyridine was obtained as colorless crystals, melting at 115–116° C.

A solution of 29 parts by weight of the N,N-diphenylcarbamic acid ester of 3-hydroxypyridine, 25 parts by weight of n-decyl bromide and 100 parts by volume of n-butyl alcohol were refluxed for 5 hours. After the reaction, the solution was concentrated in vacuo. The residue was dissolved in 40 parts by volume of chloroform, the pyridinium salt was precipitated by the addition of 160 parts by volume of ether, then reprecipitated. The product was dissolved in 100 parts by volume of absolute alcohol, decolorized with charcoal and evaporated to dryness. The purified N,N-diphenyl-carbamic acid ester of 1-n-decyl-3-hydroxypyridinium bromide was obtained as a resin which was very slightly soluble in water and readily soluble in ethanol and propylene glycol.

A solution of 11 parts by weight of the N,N-diphenyl-carbamic acid ester of 1-n-decyl-3-hydroxypyridinium bromide in 200 parts by volume of 50% ethanol was passed through 20 parts by weight of the anion exchange resin Ionac A–300 (an amino-triazine-formaldehyde anion exchange resin commercially available from American Cyanamid Co., New York, N. Y., see U. S. Patent No. 2,251,234), which had previously been treated with hydrochloric acid. This solution was then concentrated in vacuo, the residue was dissolved in absolute alcohol and benzene, and again evaporated to dryness. The N,N-diphenyl-carbamic acid ester of 1-n-decyl-3-hydroxypyridinium chloride was obtained as an amorphous residue.

There was obtained in similar manner the oily N,N-diphenyl-carbamic acid ester of 1-n-decyl-3-hydroxypyridinium fluoride by passing a solution of the corresponding bromide obtained through the above identified anion exchange resin previously treated with hydrofluoric acid.

*Example 2*

14 parts by weight of the N,N-diphenyl-carbamic acid ester of 3-hydroxypyridine were refluxed with 12 parts by weight of n-octyl bromide in 50 parts by volume of n-butyl alcohol for 5 hours. The solution was then evaporated in vacuo on a steam bath. The residue was dissolved in chloroform and precipitated with ether. The mother liquor was decanted off, the precipitate was dissolved in alcohol and again precipitated by the addition of ether. Finally, the material was dissolved in absolute alcohol, treated with charcoal and the solution was evaporated to dryness. The N,N-diphenyl-carbamic acid ester of 1-n-octyl-3-hydroxy-pyridinium bromide was obtained as a resin.

*Example 3*

The N,N-diphenyl-carbamic acid ester of 1-n-undecyl-3-hydroxypyridinium bromide was obtained as a resin from 15 parts by weight of the N,N-diphenyl-carbamic acid ester of 3-hydroxy-pyridine, 15 parts by weight of n-undecyl bromide and 70 parts by volume of n-butyl alcohol according to the procedure described for the production of the N,N-diphenyl-carbamic acid ester of 1-n-undecyl-3-hydroxypyridinium bromide in Example 1.

*Example 4*

10 parts by weight of the N,N-diphenyl-carbamic acid ester of 3-hydroxypyridine, 10 parts by weight of lauryl bromide, and 40 parts by volume of n-butyl alcohol were refluxed for 5–6 hours. The reaction mixture was worked up according to the procedure described in Example 1. The N,N-diphenyl-carbamic acid ester of 1-n-dodecyl-3-hydroxypyridinium bromide was obtained in the form of a resin, very slightly soluble in water and easily soluble in alcohol.

*Example 5*

13 parts by weight of the N,N-diphenyl-carbamic acid ester of 3-hydroxypyridine, 18 parts by weight of cetyl bromide, and 60 parts by volume of n-butyl alcohol were refluxed for 7 hours, and the reaction mixture was worked up according to the procedure described in Example 1. There was obtained a resin which comprised the pure N,N-diphenyl-carbamic acid ester of 1-n-hexadecyl-3-hydroxypyridinium bromide.

The N,N-diphenyl-carbamic acid ester of 1-n-octadecyl-3-hydroxypyridinium bromide was obtained according to the procedure described above by substituting stearyl bromide for the cetyl bromide.

*Example 6*

15 parts by weight of the N,N-diphenyl-carbamic acid ester of 3-hydroxypyridine, 15 parts by weight of 11-bromo-1-undecene and 60 parts by volume of n-butyl-alcohol were refluxed for 7 hours. The product was worked up as described in Example 1 to obtain the N,N-diphenyl-carbamic acid ester of 1-undecnyl-3-hydroxy-pyridinium bromide as a resin.

*Example 7*

10 parts by weight of 5-hydroxy-2-picoline and 21 parts by weight of N,N-diphenyl-carbamic acid chloride were dissolved in 50 parts by volume of pyridine and refluxed for 5 hours. The solution was evaporated to dryness and the residue was dissolved in benzene and water. The benzene layer was washed with dilute sodium hydroxide solution and with water, dried over sodium sulfate and evaporated to dryness in vacuo. The solid residue was dissolved and crystallized from 100 parts by volume of butyl ether. The product, the N,N-diphenyl-carbamic acid ester of 5-hydroxy-2-methyl pyridine, was obtained as colorless crystals melting at 132–133° C.

The tertiary base obtained about was refluxed with 20 parts by weight of n-decyl bromide and 80 parts by volume of n-butyl alcohol for 8 hours. Upon cooling, some N,N-diphenyl-carbamic acid ester of 5-hydroxy-2-methyl pyridine hydrobromide precipitated, M. P. 240° C. (with dec.). The solution was filtered and then concentrated. The N,N-diphenylcarbamic acid ester of 1-n-decyl-2 methyl-5-hydroxypyridinium bromide crystallized. The product was recrystallized from isopropyl alcohol. The product formed colorless glossy crystals, M. P. 188–189° C.

*Example 8*

A solution of 88 parts by weight of N-methyl-p-chloro-aniline and 48 parts by weight of pyridine in 240 parts by volume of xylene was dropped into a stirred and cooled solution of 70 parts by weight of phosgene in 340 parts by volume of xylene. When all the material had been introduced, the mixture was stirred at 50° C. for a while longer. The solution was decanted from precipitated pyridine hydrochloride and evaporated to dryness. The residue was distilled at 153 to 155° $C._{13\ mm.}$ N-methyl-N-p-chlorophenyl-carbamic acid chloride solidified as colorless plates, M. P. 65–67° C.

40 parts by weight of 3-hydroxypyridine were refluxed for 5 hours with the acid chloride obtained above and with 240 parts by volume of pyridine. The reaction mixture was then evaporated to dryness. The residue was dissolved in benzene and water, the benzene solution was washed with dilute sodium hydroxide solution and water, dried over water-free sodium sulfate and the solvent was then distilled off in vacuo. The residue was distilled at 157–159° $C._{0.02\ mm.}$ The N-methyl-N-p-chlorophenyl carbamic acid ester of 3-hydroxypyridine was obtained as a colorless liquid.

100 parts by weight of N-methyl-N-p-chlorophenyl-carbamic acid ester of 3-hydroxypyridine, 100 parts by weight of n-decyl bromide and 500 parts by volume of n-butyl alcohol were refluxed for 6 hours and immediately worked up as described in Example 1 with respect to the production of the N,N-diphenyl-carbamic acid ester of 1-n-decyl-3-hydroxy-pyridinum bromide. The N-methyl-N-p-chlorophenyl-carbamic acid ester of 1-n-decyl-3-hydroxy-pyridinium bromide was obtained as a viscous oil.

*Example 9*

Phosgene was introduced into 30 parts by weight of p,p'-dichlorodiphenylamine, heated to 140° C., until saturation. The solid obtained upon cooling was dissolved and crystallized from 35 parts by volume of ethanol. 36 parts by weight of the p,p-dichlorodiphenyl-carbamic acid chloride thus obtained (colorless needles melting at 96–97° C.) were refluxed with 12 parts by weight of 3-hydroxypyridine and 90 parts by volume of pyridine for 5 hours. The pyridine was then distilled off in vacuo and the residue was dissolved in benzene and water. The benzene extract was washed with dilute sodium hydroxide solution and with water, dried with water-free sodium sulfate and evaporated to dryness. The solid residue was dissolved and crystallized from 60 parts by volume of methanol. There was obtained the N,N-(p,p'-dichlorodiphenyl)-carbamic acid ester of 3-hydroxypyridine, M. P. 122–124° C.

The ester obtained above was refluxed for 4 hours with 26 parts by weight of n-decyl bromide and 100 parts by volume of n-butyl alcohol. The solution was evaporated to dryness, the residue was dissolved in chloroform and the bromide was precipitated with ether. The oil which was separated was dissolved in 50 parts by volume of absolute alcohol and 50 parts by volume of benzene and treated with dry ether until the appearance of turbidity. The N,N-(p,p'-dichlorodiphenyl)-carbamic acid ester of 1-n-decyl-3-hydroxy-pyridinium bromide precipitated slowly as colorless crystals. The product was recrystallized from a mixture of acetone-benzene and ether and melted at 88–90° C. The product is very slightly soluble in water.

*Example 10*

12 parts by weight of N,N-(p,p'-dichlorodiphenyl)-carbamic acid ester of 3-hydroxypyridine, 12 parts by weight of lauryl bromide and 50 parts by volume of n-butyl alcohol were refluxed for 6 hours and thereafter evaporated to dryness in vacuo. The residue was dissolved in 50 parts by volume of chloroform and 50 parts by volume of benzene and this solution was then added to 800 parts by volume of ether. The N,N-(p,p'-dichlorodiphenyl)-carbamic acid ester of 1-n-dodecyl-3-hydroxypyridinium bromide crystallized and then was recrystallized from chloroform and ether. The pure bromide formed colorless crystals melting at 105–107° C.

*Example 11*

50 parts by weight of phosgene were dissolved in 150 parts by volume of xylene. To this stirred solution, cooled to —10° C., was dropped slowly a solution of 64 parts by weight of N-methyl-p-anisidine and 37 parts by weight of pyridine in 260 parts by weight of xylene. The mixture was stirred until it warmed to room temperature. The pyridine hydrochloride which precipitated was filtered off, the solution was evaporated to dryness and the residue was distilled in vacuo. N-methyl-N-p-methoxyphenyl-carbamic acid chloride was obtained as a colorless liquid which distilled at 168–169° $C._{17\ mm.}$ 23 parts by weight of N-methyl-N-p-methoxyphenyl-carbamic acid chloride, 11 parts by weight of 3-hydroxypyridine and 60 parts by volume of pyridine were refluxed for 4 hours. The mixture was evaporated to dryness and the residue was extracted with benzene and water. The benzene solution was washed with dilute sodium hydroxide solution and water, dried over water-free sodium sulfate and the solvent was then distilled off in vacuo. The residue was distilled at 165° $C._{0.05\ mm.}$ The N-methyl-N-p-methoxyphenyl-carbamic acid ester of 3-hydroxypyridine was obtained as a yellow liquid.

20 parts by weight of the N-methyl-N-p-methoxyphenyl-carbamic acid ester of 3-hydroxypyridine, 23 parts by weight of n-decyl bromide and 95 parts by volume of n-butyl alcohol were refluxed for 6 hours. The reaction mixture was then worked up as described in Example 1 for the production of the N,N-diphenyl-carbamic acid ester of 1-n-decyl-3-hydroxypyridinium bromide. The N-methyl-N-p-methoxyphenyl-carbamic acid ester of 1-n-decyl-3-hydroxypyridinium bromide was obtained as a viscous oil slightly soluble in water.

*Example 12*

A solution of 50 parts by weight of N-ethyl-p-toluidine and 30 parts by weight of pyridine in 200 parts by volume of xylene was dropped into a stirred and cooled solution of 40 parts by weight of phosgene in 120 parts by volume of xylene. When all the material had been introduced the mixture was stirred until it reached room temperature. The pyridine hydrochloride which precipitated was filtered off, the solution was evaporated to dryness and the residue was distilled at 151–152° $C._{25\ mm.}$ N-ethyl-N-p-tolyl-carbamic acid chloride was obtained as a colorless liquid. 50 parts by weight of the acid chloride was refluxed with 24 parts by weight of 3-hydroxypyridine and 120 parts by volume of pyridine for 6 hours and the mixture was subsequently evaporated to dryness. The residue was dissolved in benzene and water, the benzene solution was washed with dilute sodium hydroxide solution and water and dried with sodium sulfate. The solution was concentrated in vacuo and the residue was distilled at 130–131° $C._{0.01\ mm.}$ The N-ethyl-N-p-tolyl-carbamic acid ester of 3-hydroxypyridine was obtained as a light yellow liquid.

13 parts by weight of the N-ethyl-N-p-tolyl-carbamic acid ester of 3-hydroxypyridine, 15 parts by weight of n-undecyl bromide and 60 parts by volume of n-butyl alcohol were refluxed for 6 hours. The reaction mixture was worked up as described in Example 1 for the production of the N,N-diphenyl-carbamic acid ester of 1-n-decyl-3-hydroxypyridinium bromide. The N-ethyl-N-p-tolyl-carbamic acid ester of 1-n-undecyl-3-hydroxypyridinium bromide was obtained as a viscous oil which was slightly soluble in water and readily soluble in alcohol and chloroform.

We claim:

1. A compound selected from the group having the formula

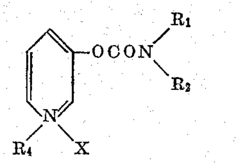

wherein $R_1$ and $R_2$ each represents a member of the group consisting of phenyl and monohalophenyl, $R_4$ represents an alkyl radical having 10 to 12 carbon atoms, and X represents a pharmaceutically acceptable anion of an acid.

2. N,N-diphenyl-carbamic acid ester of 1-n-decyl-3-hydroxypyridinium bromide.

3. N,N-diphenyl-carbamic acid ester of 1-n-dodecyl-3-hydroxypyridinium bromide.

4. N,N-(p,p'-dichlorodiphenyl)-carbamic acid ester of 1-n-decyl-3-hydroxypyridinium bromide.

5. N,N-(p,p'-dichlorodiphenyl)-carbamic acid ester of 1-n-dodecyl-3-hydroxypyridinium bromide.

6. N,N-diphenyl-carbamic acid ester of 1-n-undecyl-3-hydroxypyridinium bromide.

References Cited in the file of this patent

FOREIGN PATENTS 498,633 Canada ............... Dec. 22, 1953